United States Patent [19]

Comardo

[11] Patent Number: 4,995,129
[45] Date of Patent: Feb. 26, 1991

[54] COLLAPSIBLE TRAILER/RAMP ASSEMBLY

[76] Inventor: Mathis P. Comardo, 5301 Nolda St., Houston, Tex. 77007

[21] Appl. No.: 302,924

[22] Filed: Jan. 30, 1989

Related U.S. Application Data

[63] Continuation of Ser. No. 179,628, Apr. 8, 1988, abandoned.

[51] Int. Cl.$^5$ .............................................. B65G 67/02
[52] U.S. Cl. ...................................... 14/71.1; 14/72.5; 280/37; 280/656; 414/537
[58] Field of Search ...................... 280/37, 656, 491.1, 280/491.4, 639; 108/112; 296/43; 14/71.1, 72.5; 414/537

[56] References Cited

U.S. PATENT DOCUMENTS

| | | | |
|---|---|---|---|
| 1,631,118 | 6/1927 | Burkart | 296/43 |
| 2,633,395 | 3/1953 | Zenner | 108/112 X |
| 3,034,801 | 5/1962 | Huston | 280/37 |
| 4,266,791 | 5/1981 | Myers | 280/37 |
| 4,746,142 | 5/1988 | Davis | 280/656 |

FOREIGN PATENT DOCUMENTS

| | | | |
|---|---|---|---|
| 2132570 | 7/1984 | United Kingdom | 280/656 |
| 2175547 | 12/1986 | United Kingdom | 280/656 |

Primary Examiner—Charles A. Marmor
Assistant Examiner—Michael Mar
Attorney, Agent, or Firm—James L. Jackson

[57] ABSTRACT

A collapsible trailer/ramp assembly is provided which is formed by a pair of deck plates that are interconnected by a hinge along the longitudinal centerline of the deck. The downturned side and end edges of the plates and a plurality of longitudinal and transverse structural members provide the trailer or ramp structure with efficient structural integrity. These structural members also function to define a storage receptacle which is adapted to receive the drawbar structure, wheel assemblies, transverse structural bridge plates and locking pins of the trailer/ramp assembly. When the deck sections are folded the storage receptacle is completely closed to thereby prevent loss of any of the stored components of the trailer/ramp assembly. All of the component parts are assembled to the deck sections by means of manually insertible and removable pins so that tools and other equipment are not required for assembly and disassembly procedures. With the wheel assemblies and drawbar assemblies removed from the unfolded deck sections, the deck sections form a unique ramp that can be efficiently used for loading and unloading operations.

20 Claims, 3 Drawing Sheets

COLLAPSIBLE TRAILER/RAMP ASSEMBLY

This is a continuation of application Ser. No. 07/179,628 filed on Apr. 8, 1988 now abandoned.

FIELD OF THE INVENTION

This invention relates generally to trailers such as are towed behind various types of vehicles, including garden tractors, all terrain vehicles (ATV), etc. More specifically, the present invention is directed to a trailer assembly having a deck structure that is capable of being folded along a central axis to form a structure of small dimension for efficient storage and to form a storage receptacle for various component parts of the trailer structure. Additionally, the present invention is directed to a foldable trailer deck structure that also functions efficiently as a ramp provided with safety rails to facilitate safe loading and unloading.

BACKGROUND OF THE INVENTION

In circumstances where off road sporting activities are being conducted, two, three and four wheel ATVs are frequently utilized. For transportation of ATVs to and from remote recreational facilities, small trailers and trucks are often employed. Where small trucks or trailers are employed to transport ATVs the trucks or trailers must also transport ramp devices that may be used in the field to accomplish ATV loading and unloading operations. Obviously, where truck or trailer ramps are employed such may be utilized only in conjunction with trucks or trailers designed for roadway operation. At times it is desirable to provide ATVs with small field trailers in order to permit transportation of equipment into remote areas that are inaccessible to the truck or road trailer. If such is done, the truck or road trailer must also have sufficient transporting capability for a small all terrain trailer. Typically, such is not the case. Most pickup trucks or road trailers are capable of efficiently transporting only a single ATV and do not ordinarily provide sufficient carrying capacity for both an ATV, an off-road or all terrain trailer, and the ramps for loading and unloading the ATV and trailer.

It is desirable, therefore to provide an off-road or all terrain trailer that may be efficiently stored within a truck, road trailer or other vehicle transporting an ATV and which trailer assembly is also capable of serving as a ramp device for loading and unloading the ATV.

The trucks and trailers that are ordinarily provided for transporting ATVs and similar equipment may be provided with ramp devices to facilitate loading and unloading operations. In many cases trailer or truck ramps are in the form of elongate channel members that are sufficiently wide to receive the wide all terrain tires of ATVs. In most cases the flange on each side of the ramps is only two to three inches in height. During loading and unloading operations it is relatively easy for the large deep treaded all terrain tires to climb these side flanges, thus allowing the vehicle to fall. Obviously in such cases there is significant danger to the passenger of the ATV and to other personnel and equipment in the immediate vicinity. It is desirable therefore to provide a ramp device that facilitates safe and efficient loading and unloading operations and provides sufficient guiding capability to insure that the ATV or other apparatus does not fall from the ramp.

Various small trailers are frequently utilized in the domestic environment for gardening activities and for hauling small loads behind a small garden tractor. Although small trailers are efficient for such uses in the domestic environment, when the hauling operation has been completed, the small trailer often becomes a handicap from the standpoint of storage. Small lawn and garden trailer are ordinarily difficult to store and frequently must remain exposed to the elements since storage thereof is often impractical. It is desirable, therefore, to provide a trailer assembly capable of being utilized for small loads in the domestic environment and yet having the capability of being folded to a small dimension for efficient handling and storage.

SUMMARY OF THE INVENTION

It is a primary feature of the present invention, therefore, to provide a novel convertible collapsible trailer/ramp assembly that may be efficiently folded to a small, efficiently configured dimension for ease of storage and handling.

It is another feature of this invention to provide a novel convertible, collapsible trailer/ramp assembly that functions efficiently as a ramp to enable loading and unloading of ATVs and other such equipment from small trucks and other vehicles.

It is an even further feature of this invention to provide a novel collapsible trailer/ramp assembly that is capable of being folded along a central axis to form a protective enclosure for the various removable components thereof, and which enclosure is of generally rectangular form for ease of storage and handling when not being utilized as a trailer or ramp.

It is also an important feature of this invention to provide a novel convertible, collapsible trailer/ramp assembly that is retained in assembly by means of locking pins capable of being manually inserted and removed, thereby enabling the trailer/ramp assembly to be assembled and without necessitating the use of tools.

Briefly, a convertible collapsible trailer/ramp assembly constructed in accordance with the present invention incorporates a pair of generally rectangular deck plates having respective side edges thereof bent to a position normal with the deck plates and forming peripheral structural flanges for the sides and ends of each plate. A plurality of structural members are then fixed to the underside of each of the deck plates and extend in substantially normal relation with the deck plates to form other structural members to thus provide a pair of deck sections of light weight and having efficient structural integrity. An elongated hinge member extends a significant portion of the axial length of the deck sections and is welded or otherwise fixed to each of the deck sections to provide a two-fold purpose. The hinge member provides for pivotal interconnection of the deck sections thus enabling the deck sections to be folded from a flat trailer deck or trailer ramp configuration to a half trailer dimension for efficient storage and handling. The hinge member includes a pair of hinge plates or flanges that are welded to the inner side edges of the deck plates of each deck section. The plates or flanges of the hinge structure, in the folded out condition of the trailer deck or ramp, are disposed in normal relation to the deck plates and thus function as structural members to provide the central portion of the trailer assembly with efficient structural integrity. The various structural members of each of the deck sections form wheel receptacle means and cooperate in the folded condition of the deck sections to form storage receptacle means for the various component parts of the trailer assembly.

A pair of wheel assemblies are removably received by the wheel receptacles and are secured in the wheel receptacles by means of lock pins. In the flat or folded out condition of the trailer deck, deck locking plates are secured to respective structural members by means of locking pins and thus function to prevent folding of the deck sections while the deck is utilized as a trailer or as a ramp. A draw bar is removably received by the deck sections and provides a hitch receiving means for connection to the trailer hitch of a vehicle utilized for towing. At least one of the deck lock plates is fixed in transverse relation to the draw bar and functions to releasably secure the draw bar to the deck sections and also functions to secure the deck sections in the flat, unfolded condition thereof.

Further, when utilized as a trailer structure or as a deck the deck sections and the various components of the trailer are adapted to be secured by locking pins. These locking pins enable the ramp or trailer structure to be secured by means of manual assembly without necessitating the use of tools. When storage or transportation of the collapsible trailer/ramp assembly is desired, all of the locking pins are removed, the wheel assemblies and draw bar assembly are removed, thereby freeing the ramp sections for pivoting. The wheel assemblies, draw bar, locking plates and locking pins are positioned within appropriate storage receptacles defined by the cooperating structural members of the deck sections. The ramp sections are secured in the folded condition thereof, thus preventing loss of any of the component parts located within the storage receptacles. When so folded and secured, the trailer/ramp assembly in its collapsed position is of generally rectangular form for efficient storage. Being constructed of lightweight materials such as aluminum it is also capable of being handled by one person or quite easily handled by two persons.

In order to facilitate safe loading and unloading operations when the deck structure is utilized as a ramp, each of the deck sections is provided with pairs of pockets or receptacles that receive the upright supports of a pair of side frames. These side frames are of sufficient height that the large, deep treaded wheels of ATVs and other similar apparatus cannot climb over the side frames during loading and unloading operations. Thus, when utilized as a loading ramp, the deck sections provide for safe and efficient loading and unloading even under conditions of poor light.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 is an isometric illustration of a convertible collapsible trailer/ramp assembly constructed in accordance with the present invention and being shown in the completely assembled condition thereof.

FIG. 2 is an isometric illustration of the convertible collapsible trailer/ramp assembly of FIG. 1, shown in the folded condition thereof.

FIG. 3 is an isometric illustration of the convertible collapsible trailer/ramp assembly showing the deck section of the trailer being utilized as a ramp such as for loading and unloading operations.

FIG. 4 is a transverse sectional view taken along line 4—4 of FIG. 1 and having one side thereof exploded to illustrate connection of the wheel assemblies to the trailer structure.

FIG. 5 is a bottom view of the collapsible trailer/ramp assembly of FIG. 1 shown in its flat, locked condition but with the wheel assemblies thereof removed.

FIG. 6 is an isometric illustration of a major portion of the draw bar of the collapsible trailer/ramp assembly of FIGS. 1 and 5.

FIG. 7 is a fragmentary sectional view of the collapsible trailer/ramp assembly taken along line 7—7 of FIG. 5.

FIG. 8 is a fragmentary sectional view taken along line 8—8 of FIG. 5.

FIG. 9 is a bottom view of the collapsible trailer/ramp assembly similar to that of FIG. 5 and with the various removable components thereof removed and placed within the storage receptacles prior to being secured therein upon folding of the deck sections.

DETAILED DESCRIPTION OF PREFERRED EMBODIMENT

Figure 1:
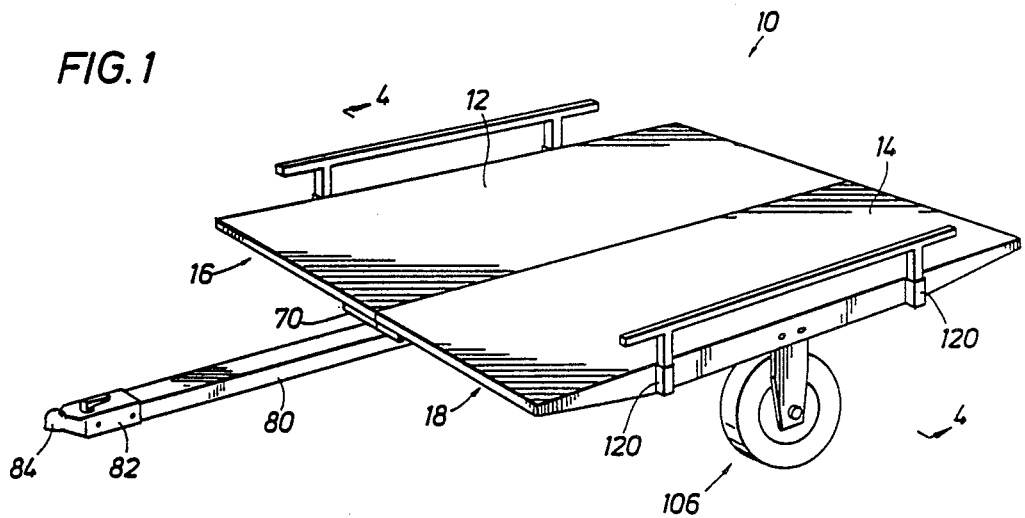

Referring now to the drawings and first to FIG. 1 a convertible collapsible trailer/ramp assembly constructed in accordance with the present invention is illustrated generally at 10 and incorporates a pair of deck plates 12 and 14 having structural flanges that are defined by downturned front, rear and side edges. These deck plates together with the respective front, rear and side edges thereof and together with various structural members thereof as discussed in detail hereinbelow define a pair of side-by-side deck sections illustrated generally at 16 and 18. As shown in greater detail in FIGS. 5 and 9 the deck section 16 includes downturned front and rear edges 20 and 22 and opposed downturned side edges 24 and 26. A reinforcement bar 24a is fixed by welding or the like to side edge 24 to provide increased structural integrity at the outer side portion of the deck section 16. The deck plate 14 of deck section 18 forms downturned end edges 21 and 23 and downturned side edges 25, 25a and 27. Another reinforcement bar 25a is fixed to side edge 25 to strengthen the outside portion of deck section 18. The front edges and the side edges extend in substantially normal relation with respect to the deck plates 12 and 14 and thus function as structural members to provide the respective deck sections with efficient structural integrity with the strength of the side edges being enhanced by reinforcing bars 24a and 25a. As further shown in FIGS. 5 and 9 the deck section 16 is provided with transverse structural members 28, 72, 30 and 86 that are welded or otherwise secured to the underside of the respective deck plates with the respective end portions thereof being welded or otherwise secured to respective side plates 24a and 26. Deck section 18 is provided with substantially identical transverse structural members 29, 74, 31 and 88 for the same purpose. "L" shaped longitudinal structural members 32 and 34 are likewise positioned in assembly with the underside of respective deck plates and are secured to the deck plates by welding or by any other suitable means of connection. These "L" shaped longitudinal structural members define downwardly extending flanges 34a that provide the central outside edge portions of the trailer/ramp assembly with efficient structural integrity and also serve to provide support for the wheel assemblies.

Figure 4:
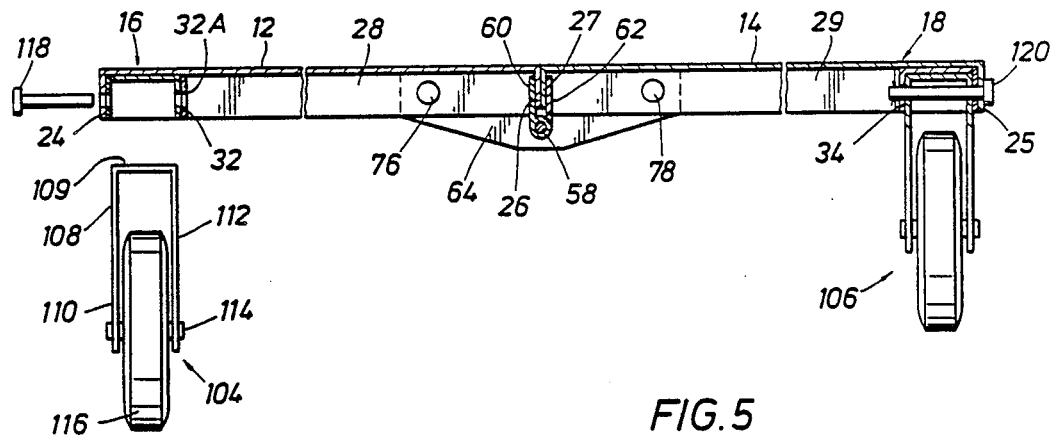

The flanges 32a and 34a of transverse structural segments 32 and 34 extend downwardly from the underside of the deck plates 12 and 14. The longitudinal structural members 32 and 34 are located so as to reinforce deck plates 12 and 14 so as to distribute load from the wheel assemblies 108 of FIG. 4. Furthermore, members 32 and 34 are reinforced by members 32a and member 34a by being welded or otherwise attached to members 32 and 34 as well as being attached to deck plate members 12 and 14.

The associated pairs of transverse structural plates 28, 72, 30 and 86 cooperate with the respective side plates 24 and with respective longitudinal "L" shaped members 32 and 34 to define a generally rectangular storage receptacle 52 within which the wheel assemblies, locking plates, locking pins and drawbar assembly may be efficiently received.

Figure 2:
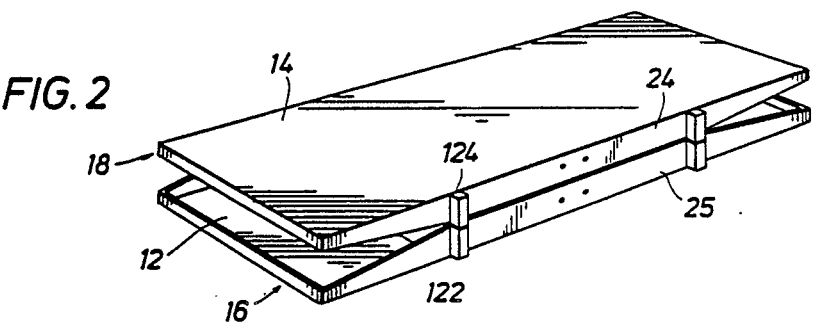

In order to permit folding of the deck sections 16 and 18 from the flat condition shown in FIG. 1 to the folded condition shown in FIG. 2. The trailer/ramp assembly is provided with at least one hinge member 58 which defines a pair of hinge plates 60 and 62 that are secured by welding or by any other suitable means of attachment to the respective downturned inner flanges 26 and 27 of the respective deck sections. The hinge plates 60 and 62 in this condition function essentially as longitudinal structural members, enhancing the structural integrity that is provided by the downturned inner side edges 26 and 27 of the respective deck plates 12 and 14. Thus, the elongated hinge 58 serves both as a hinge to permit folding of the deck sections and also provides additional structural integrity for the central portion of the trailer or ramp structure when positioned as shown in FIGS. 1 and 3.

Figure 3:
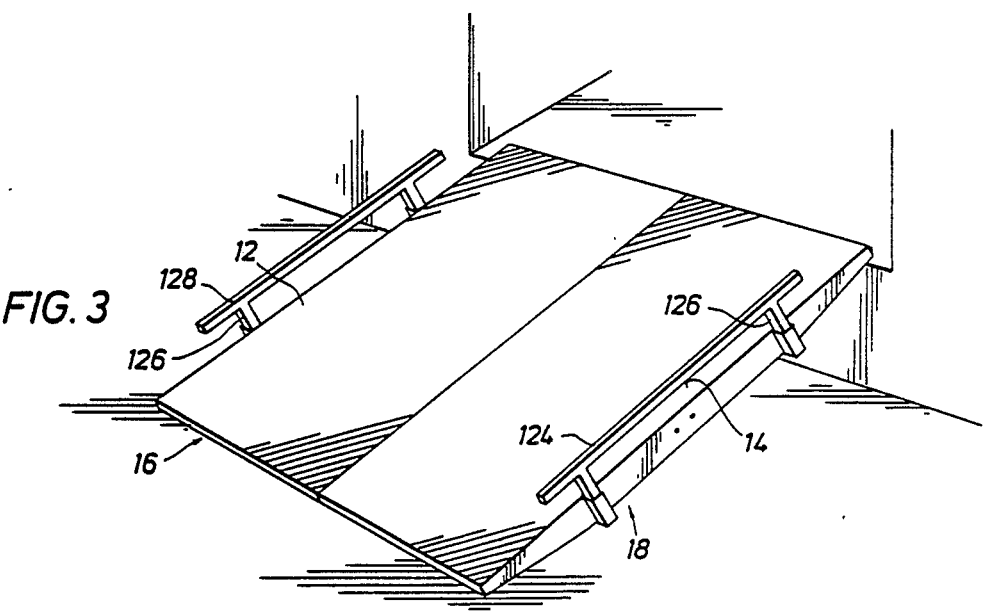
Figure 8:
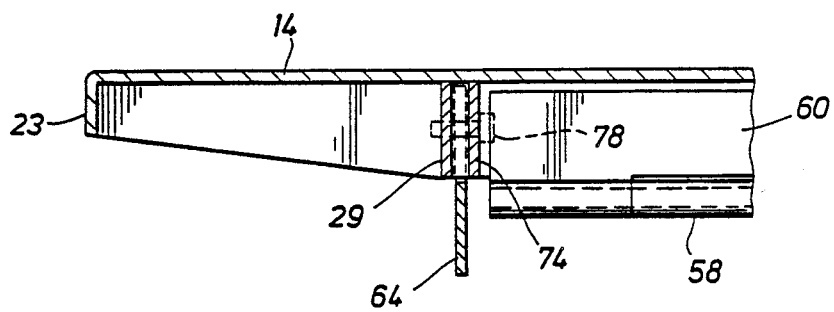

To maintain the trailer/ramp assembly in the flat condition shown in FIGS. 1 and 3 a plurality of transverse locking bridge plates 64, 66 and 68 are removably secured in transverse relation across the longitudinal centerline defined by the joint between the deck sections 16 and 18. At the rear portion of the trailer/ramp assembly, transverse structural members 72 and 74 are welded or otherwise secured to the undersides of the respective deck plates 12 and 14 with the inner ends thereof fixed to the respective inner edge members 26 and 27 as well as being attached by welding or other means to members 24 and 25. The transverse structural members 72 and 74 are disposed in spaced relation with respective transverse structural members 28 and 29 such that a transverse space is provided to receive the removable structural member 64. A pair of locking pins 76 and 78 extend through appropriate apertures formed in the transverse structural members thereby positively securing the structural locking plate member 64 in the position shown in FIGS. 4, 5 and 8.

Figure 5:
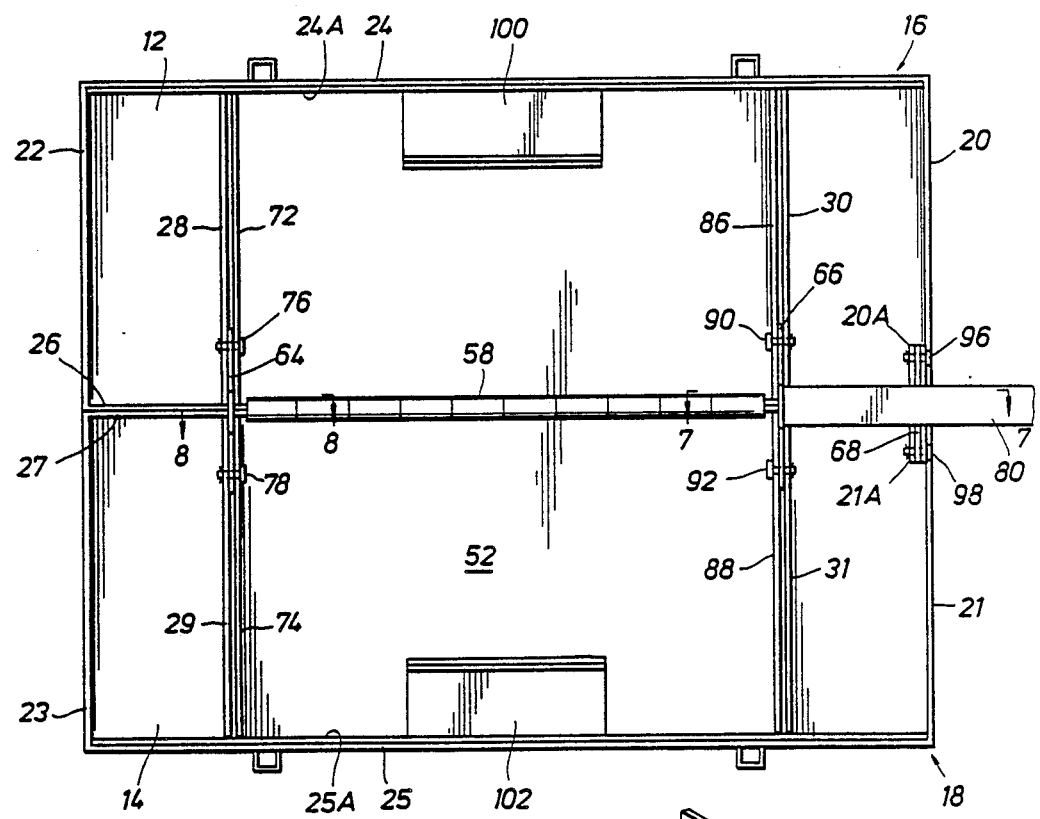
Figure 6:
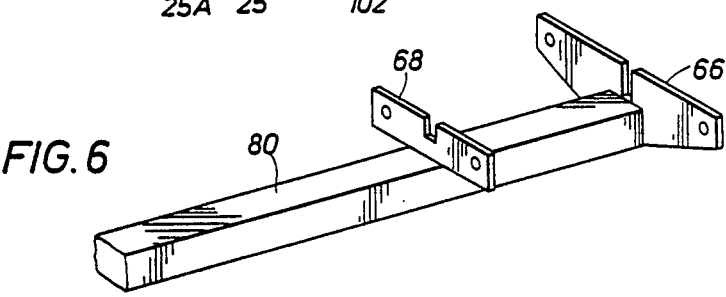
Figure 7:
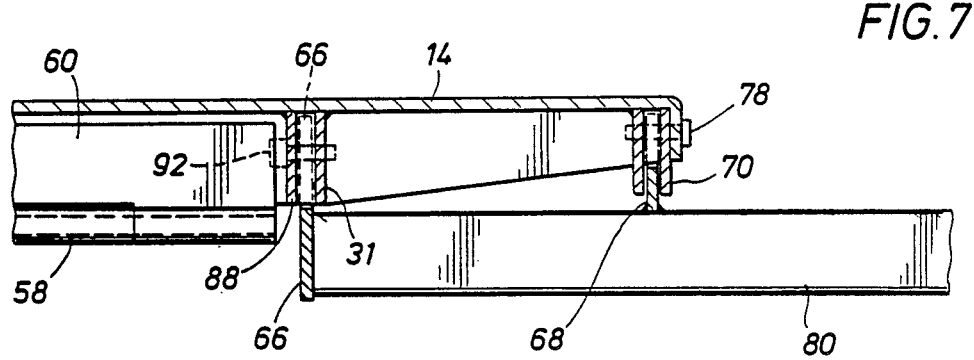

At the forward portion of the trailer assembly the transverse locking plates 66 and 68 are fixed by welding or other suitable means of connection to a drawbar member 80 having a hitch assembly 82 with a hitch receptacle 84 at the free extremity thereof. Transverse structural locking plate member 66 is secured to the rear end portion of the drawbar 80 and is adapted to be received within a space defined between a pair of transverse structural members 86 and 88 and transverse structural members 30 and 31 of the respective deck sections. A pair of locking pins 90 and 92 are employed to secure the transverse structural locking plate 66 and the rear portion of the drawbar 80 in substantially fixed relation with respect to the deck sections. The transverse structural locking plate 68 the drawbar assembly is fixed intermediate the extremities of the drawbar 80 as shown in FIG. 6. A pair of plate members 20a and 21a are secured to the respective deck plates and are positioned in spaced parallel relation with respective end portions 20 and 21. When the drawbar is positioned in assembled relation to the deck sections in the manner shown in FIGS. 5 and 7 the locking plate 66 will be positioned in the space defined by the parallel members 30, 86, and 31, 88 will function as a transverse structural bridge to secure the deck sections in flat condition. Likewise transverse locking plate 68 is received in the spaces defined by the cooperating spaced members 20, 20a, and 21, 21a. Locking plate 68 also serves as transverse structural bridge. A pair of locking pins 96 and 98 are extended through appropriate aligned apertures of the flanges 20, 20a and 21, 21a and locking plate 68 to secure the locking plate and drawbar in releasable assembly with the deck sections.

With the deck sections folded to the flat condition as shown in FIGS. 1, 3, 5 and 9 the respective transverse locking plates, including those secured to the drawbar, are easily assembled or disassembled with respect to the trailer structure without necessitating the use of tools. The respective apertures are simply aligned and the locking pins are manually inserted through the apertures and secured by means of keepers or other suitable devices to insure that the locking pins remain in position. During disassembly of the trailer structure the locking pins are easily extracted from the respective apertures thereby releasing the transverse structural plate 64 and the drawbar assembly including its transverse structural plates from the trailer assembly. Thereafter, the deck sections may be easily folded about the hinge 58 to the condition shown in FIG. 2.

Figure 9:
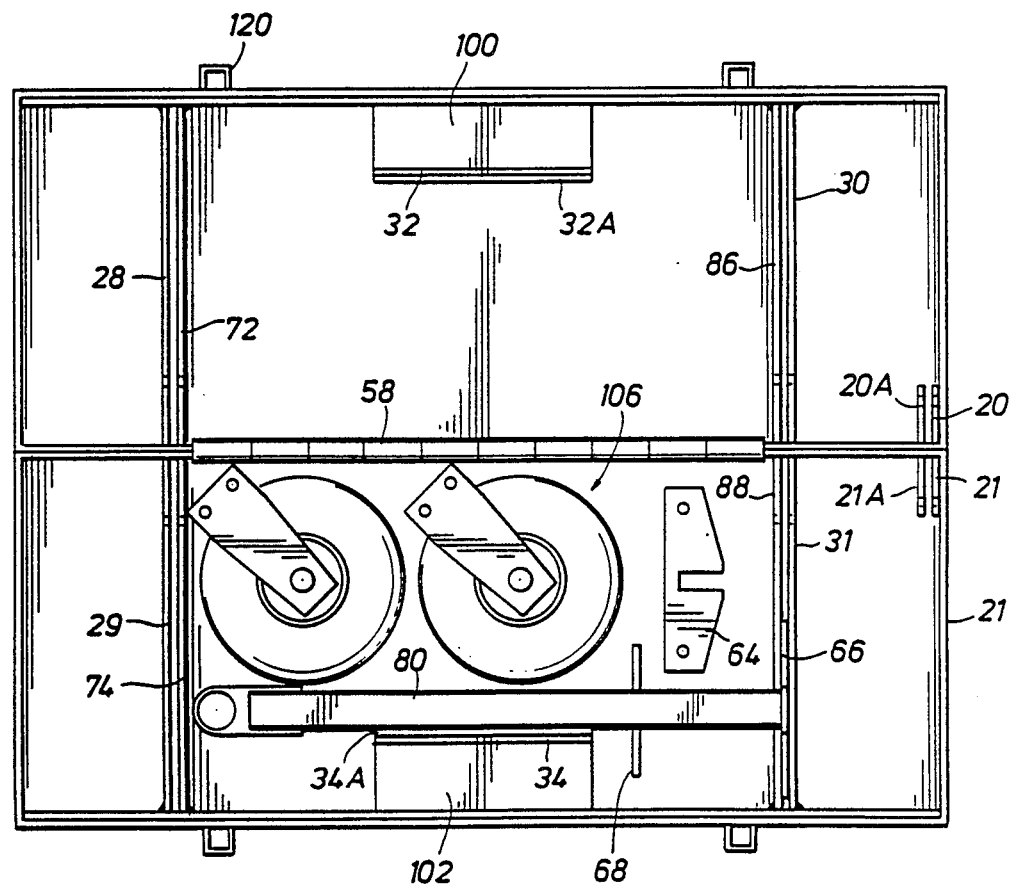

As described above the downwardly extending flanges 32a and 34a of the structural members 32 and 34 of the respective deck sections cooperate to form flanges 32a and 34a of the sockets or receptacles for the wheel assemblies. As shown in FIGS. 5 and 9 and also in the sectional view of FIG. 4 a generally rectangular open ended socket or receptacle 100 is defined by cooperating structural members 24 and 32. The opposite deck section 18 includes a substantially identical open ended socket or receptacle 102 which is defined by cooperating structural members 25 and 34.

A pair of wheel assemblies are provided as shown generally at 104 and 106. The wheel assemblies are substantially identical and each include a bifurcated wheel support 108 provided with a pair of depending legs 110 and 112 having the axle 114 of a wheel 116 fixed between the lower extremities thereof. The wheel 116 is of the pneumatic type including a metal or polymer rim supporting a rubber pneumatic tire. The upper portion of the wheel support 108 is of generally rectangular configuration and fits closely within the respective rectangular receptacle 100 or 102 such that the legs 110 and 112 are disposed in parallel relation with the respective structural members 24 and 32 or 25 and 34. The front and rear edges of the support members are preferably tapered as shown. With the wheel supports received within the respective receptacles locking pins 119 and 121 are manually extended through aligned apertures and are secured by appropriate keepers to assure that the locking pins can not become inadvertently separated during use of the trailer. The respective depending structural members of each deck section that form the respective wheel receptacles 100 and 102 establish close fitting relation with the respective sides of the wheel support and thus provide the respective wheel assemblies with efficient structural support relative to the deck sections. The flat upper end surfaces 109 of each wheel support engage the underside of the "L" shaped members 32 and 34 and function to stabilize the wheel assemblies relative to the respective deck sections. The members 32 and 34 also serve to provide efficient force distribution between the wheel assemblies and deck sections. The wheel assemblies are efficiently assembled to or removed from the respective receptacles simply upon insertion or removal of the locking pins relative to the aligned apertures of the transverse structural members and wheel supports.

To secure loads relative to the trailer and to provide a safe guiding function during use of the apparatus as a loading ramp, each of the deck sections is provided with two or more rectangular post receptacles such as shown at 122 and 124. These post receptacles are adapted to receive the support posts 126 of guide frames 128 or other suitable transverse support devices. When the apparatus is utilized as a trailer as shown in FIG. 1, the vertical support posts of the guide frames are inserted within the respective receptacles thus supporting the guide frames in sufficiently elevated position to secure loads from falling laterally from the trailer. These guide frames also function as cleats to enable loads to be secured to the trailer by tying with ropes or other securing devices. When the apparatus is utilized as a loading ramp in the manner shown in FIG. 3, the guide frames 124 function as safety frames to prevent ATVs, garden tractors and the like from falling from the ramp. The ramp is a solid structure that prevents the wheels of vehicles from falling through the ramp in the event the vehicle might be misaligned relative to the center of the ramp. This condition can occur easily during loading and unloading operations in conditions of poor light. The guide frames 124 are sufficiently elevated relative to the surface of the ramp or trailer deck such that the deep treaded, wide wheels of ATVs and other similar vehicles cannot climb over the guide frames during loading and unloading operations. In the event a guide rail is struck by a wheel of an ATV any lateral movement of the ATV will be arrested and it will be guided safely from the ramp to the ground or to tho desired elevated position.

When the deck sections 16 and 18 are intended to be employed as a trailer ramp in the manner shown in FIG. 3, depending tabs 20, 20a and 21, 21a extending downwardly from the respective end edges 20 and 21 of the deck plates 16 and 18 are placed in gripping engagement with the loading dock, truck bed or other structure where loading or unloading activities are intended to occur. These depending tabs, with the use of a safety chain securing the ramp against displacement, provide a gripping function to prevent slippage of the ramp during loading and unloading operations.

While the foregoing is directed to the preferred embodiment, the scope thereof is determined by the claims which follow.

What is claimed is:

1. A collapsible trailer/ramp assembly comprising:
   (a) a pair of generally rectangular deck plates having a plurality of end and side flanges extending downwardly therefrom and a plurality of structural members including transverse members extending downwardly from the under side thereof and cooperating with said deck plates to form a pair of deck sections of efficient structural integrity, two of said side flanges of said deck plates being pivotally interconnected by hinge member at the lower portions thereof and forming a longitudinal pivot axis forming a longitudinal centerline of said trailer/ramp assembly and permitting said deck sections to form a compartmentalized box-like enclosure when folded about said longitudinal pivot axis, said deck sections when unfolded to substantially coextensive relation, forming a ramp for supporting objects moving thereon, said structural members defining opposed walls disposed in normal relation with said deck plates and forming wheel receptacle means and cooperating in the folded condition of said deck sections to form storage receptacle means for trailer parts, said opposed walls having pin receiving apertures formed therein;
   (b) a pair of wheel assemblies each having a bifurcated wheel support providing wheel support legs supporting an axle and wheel and having close fitting relation between said opposed walls and thus being removably received in substantially immovable relation by said wheel receptacle means;
   (c) a plurality of transverse structural bridge members being removably secured in assembly with said transverse members of said deck sections at spaced locations along the length thereof and in transverse relation to said longitudinal centerline and securing said deck sections to prevent folding thereof;
   (d) drawbar means being removably received by said deck sections in parallel relation with said longitudinal centerline and providing hitch receiving means for connection to the trailer hitch of a tow vehicle; and
   (e) a plurality of locking pins releasably securing said wheel assemblies, said transverse structural bridge members and said drawbar means to said deck sections.

2. A collapsible trailer/ramp assembly as recited in claim 1, wherein said end and side flanges are integral with said deck plates and form structural flange means enhancing the structural integrity of said deck plates.

3. A collapsible trailer/ramp assembly as recited in claim 1, wherein said hinge member is a single elongated hinge defining an opposed pair of hinge plates, with said deck plates disposed in coplanar relation said hinge plates being disposed in substantially normal relation with said deck plates and providing said side flanges and said deck plates with additional structural integrity.

4. A collapsible trailer/ramp assembly as recited in claim 1 wherein transverse structural bridge members are removably secured to said structural members in transverse bridging relation with said longitudinal centerline and function to restrain said deck sections in substantially coplanar relation and provide said structural members with additional structural integrity.

5. A collapsible trailer/ramp assembly as recited in claim 4 wherein said transverse structural bridge members are secured to said transverse structural members of said deck sections by means of manually insertible and removable locking pins being receivable in registering aperture formed therein.

6. A collapsible trailer/ramp assembly as recited in claim 4 wherein:
at least a part of said transverse structural bridge members are fixed to and extend transversely from said drawbar means and also function to support said drawbar means in removable assembly with said deck sections.

7. A collapsible trailer/ramp assembly as recited in claim 1 wherein:
(a) said wheel receptacle means is defined by the underside of said deck plates and by ones of said structural members being disposed in substantially parallel relation with said side flanges;
(b) said wheel assemblies each define wheel support means of generally rectangular cross sectional configuration and being receivable in stabilized relation in engagement with said underside of said deck plates and between said ones of said structural members and said side flanges; and
(c) manually insertible locking pin means releasably securing said wheel support means within said wheel socket means.

8. A collapsible trailer/ramp assembly as recited in claim 7 wherein:
(a) said ones of said structural members each forming planar stabilizing surfaces; and
(b) said wheel support means defines side surface means for stabilizing engagement with said planar stabilizing surfaces.

9. A collapsible trailer/ramp assembly as recited in claim 1 wherein said drawbar means, said wheel assemblies, said transverse structural bridge means and said locking pin means are all receivable in secured relation within said storage receptacle means when said deck sections are folded.

10. A collapsible trailer/ramp assembly as recited in claim 1, wherein:
(a) at least some of said transverse structural bridge members are fixed to said drawbar means and are disposed in transverse relation to said drawbar means; and
(b) said plurality of structural members are oriented to define spaces to receive said transverse structural bridge members of said drawbar means in the stored condition of said drawbar means.

11. A collapsible trailer/ramp assembly as recited in claim 1, wherein:
a plurality of post receptacle means are provided on the outer side edges of said deck plates and provide receptacles for side board posts and the like, opposed ones of said post receptacles being disposed in registry in the folded condition of said deck sections and adapted to receive locking pins to maintain said deck sections securely locked in assembly in the folded condition thereof.

12. A collapsible trailer/ramp assembly, comprising:
(a) a pair of generally rectangular deck plates having a plurality of end and side flanges extending downwardly therefrom and a plurality of structural members including transverse members extending downwardly from the under side thereof and cooperating with said deck plates to form a pair of deck sections of efficient structural integrity, two of said side flanges of said deck plates being pivotally interconnected by hinge means at the lower portions thereof and forming a longitudinal pivot axis forming a longitudinal centerline of said trailer/ramp assembly and permitting said deck sections to form a compartmentalized box-like enclosure when folded about said longitudinal pivot axis, said deck sections when unfolded to substantially coextensive relation, forming a ramp for supporting objects moving thereon, said structural members defining opposed walls disposed in normal relation with said deck plates and forming wheel receptacle means and cooperating in the folded condition of said deck sections to form storage receptacle means for trailer parts, said opposed walls having pin receiving apertures formed therein;
(b) a pair of wheel assemblies being removably received by said wheel receptacle means, said wheel assemblies each having a bifurcated wheel support providing wheel support legs supporting an axle and wheel, said wheel support legs being interposed in close fitting relation between said opposed walls and having apertures registering with said pin receiving apertures of said opposed walls;
(c) plurality of transverse structural bridge members being removably secured in locked assembly with said transverse structural members of said deck sections and extending transversally across said axial centerline and retaining said deck sections in coplanar relation and preventing folding thereof;
(d) drawbar means being removably received by said deck sections parallel relation with said central axis and providing hitch receiving means for connection to the trailer hitch of a tow at least some of said transverse structural bridge elements being fixed to said drawbar means and extending transversely therefrom; and
(e) locking pin means releasably securing said wheel assemblies, said transverse structural bridge members and said drawbar means to said deck sections.

13. A collapsible trailer/ramp assembly as recited in claim 12, wherein:
(a) said axial hinge means is a single elongated hinge defining a pair of opposed hinge plates that are secured to the inner side flanges of said deck sections and, with said deck sections unfolded, said hinge plates being disposed in substantially normal relation with said deck plates and providing additional structural integrity for said deck sections; and
(b) two of said transverse structural bridge elements are removably located at respective extremities of said single elongated hinge.

14. A collapsible trailer/ramp assembly as recited in claim 13 wherein said transverse structural bridge members are said transverse structural members form registering pin receiving apertures and said transverse structural bridge members are secured to said deck sections by means of said locking pins.

15. A collapsible trailer/ramp assembly as recited in claim 12 wherein:
(a) said bifuracted wheel supports of said wheel assemblies each form a transverse upper end cooperating with said wheel support legs to define a generally rectangular cross sectional configuration and being receivable in stabilized relation within said wheel receptacle means; and (b) manually insertible locking pin means extending through said wheel support legs and said opposed walls and releasably securing said wheel support means within said wheel socket means.

16. A collapsible trailer/ramp assembly as recited in claim 12 wherein:
   (a) said drawbar means, said wheel assemblies, said transverse structural bridge means and said locking pin means are all receivable within said storage receptacle means;
   (b) at least some of said transverse structural bridge members are fixed to said drawbar means; and
   (c) said structural members are configured to define spaces to receive said transverse structural bridge members of said drawbar means in the stored condition of said drawbar means.

17. A collapsible trailer/ramp assembly as recited in claim 12 wherein:
   (a) a part of said structural members are disposed in transverse relation with said axial centerline and are positioned in closely spaced parallel relation;
   (b) said transverse structural bridge members of said drawbar means are removably received in the space between said closely spaced parallel structural members; and
   (c) said locking pin means extending through said closely spaced parallel structural members and said transverse structural bridge members are retaining the same in releasable assembly.

18. A collapsible trailer/ramp assembly as recited in claim 12, wherein:
   a plurality of said transverse structural members form outer side edges of each of said deck sections and are defined by double plate elements fixed in intimate assembly.

19. A collapsible trailer/ramp assembly as recited in claim 12, wherein:
   said opposed walls of said wheel receptacle means are formed by double structural plate elements.

20. A collapsible trailer/ramp assembly as recited in claim 19, wherein:
   a portion of said opposed walls of each wheel receptacle means is defined by the outer side edge of its respective deck section.

* * * * *